US008259412B2

(12) United States Patent
Hsiao et al.

(10) Patent No.: US 8,259,412 B2
(45) Date of Patent: Sep. 4, 2012

(54) THERMAL FLY HEIGHT CONTROL MAGNETIC RECORDING HEAD HAVING A NOVEL HEATING ELEMENT GEOMETRY

(75) Inventors: Wen-Chien D. Hsiao, San Jose, CA (US); Xinjiang Shen, Fremont, CA (US); Jing Zhang, Los Altos, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 120 days.

(21) Appl. No.: 12/904,943

(22) Filed: Oct. 14, 2010

(65) Prior Publication Data
US 2012/0092789 A1   Apr. 19, 2012

(51) Int. Cl.
G11B 5/31 (2006.01)
(52) U.S. Cl. .................................. 360/125.31
(58) Field of Classification Search ............. 360/125.31
See application file for complete search history.

(56) References Cited

U.S. PATENT DOCUMENTS

| 6,940,691 | B2 | 9/2005 | Maat | |
|---|---|---|---|---|
| 7,133,254 | B2 | 11/2006 | Hamann et al. | |
| 7,268,973 | B2 * | 9/2007 | Lille et al. | 360/125.31 |
| 7,330,336 | B2 * | 2/2008 | Luo et al. | 360/125.31 |
| 7,362,544 | B2 | 4/2008 | Shiramatsu et al. | |
| 7,403,354 | B2 * | 7/2008 | Pust et al. | 360/125.31 |
| 7,573,682 | B2 * | 8/2009 | Pust et al. | 360/294.7 |
| 7,593,187 | B2 | 9/2009 | Aoki | |
| 7,649,714 | B2 | 1/2010 | Kato et al. | |
| 7,729,086 | B1 * | 6/2010 | Song et al. | 360/125.31 |
| 7,903,373 | B2 * | 3/2011 | Kobayashi et al. | 360/125.31 |
| 7,961,429 | B2 * | 6/2011 | Kurihara et al. | 360/125.31 |
| 8,094,418 | B2 * | 1/2012 | Schreck et al. | 360/317 |
| 2005/0018348 | A1 * | 1/2005 | Lille et al. | 360/128 |

(Continued)

FOREIGN PATENT DOCUMENTS

| JP | 2006/323932 A | 11/2006 |
|---|---|---|
| JP | 2006/3314692 A2 | 12/2006 |

OTHER PUBLICATIONS

Li et al., "Simulation of Flying Height and Response Time of Thermal Flying Height Control Sliders With Thermal Insulators," © 2010 IEEE, IEEE Transactions on Magnetics, vol. 46, No. 6, Jun. 2010, p. 1292-1294.

(Continued)

*Primary Examiner* — Mark Blouin
(74) *Attorney, Agent, or Firm* — Zilka-Kotab, PC (57) ABSTRACT

A heating element for use in a thermal fly height control magnetic recording head of a magnetic data recording system. The heating element has a centrally disposed portion with a straight front edge that is recessed by a substantially constant distance, and has first and second side portions that taper away from the air bearing surface. The side portions preferably taper away from the air bearing surface by an angle of 20 to 45 degrees. The center portion of the front edge is spaced from the air bearing surface by a distance D and has a width W, such that W is 1.5 to 2.5 (or about 2) times D. D is typically 2-6 um to have good heater efficiency while being large enough to not over heat the heater. The heating element has an overall width WW and a overall depth HH from the air bearing surface such that WW is 1.5-2.5 (or about 2) times HH.

23 Claims, 5 Drawing Sheets

U.S. PATENT DOCUMENTS

2007/0268624 A1* 11/2007 Luo et al. .............. 360/126
2009/0251828 A1   10/2009 Schreck et al.
2009/0310243 A1   12/2009 Aoki

OTHER PUBLICATIONS

Zheng et al., "Numerical Simulation of a Thermal Flying Height Control Slider With Dual Heater and Insulator Elements," © 2009 IEEE, IEEE Transactions on Magnetics, vol. 45, No. 10, Oct. 2009, p. 3628-3631.

Miyake et al., "Optimized Design of Heaters for Flying Height Adjustment to Preserve Performance and Reliability," © 2007 IEEE, IEEE Transactions on Magnetics, vol. 43, No. 6, Jun. 2007, p. 2235-2237.

* cited by examiner

THERMAL FLY HEIGHT CONTROL MAGNETIC RECORDING HEAD HAVING A NOVEL HEATING ELEMENT GEOMETRY

FIELD OF THE INVENTION

The present invention relates to perpendicular magnetic write heads and more particularly to a thermal fly height control magnetic write head having a novel heater element design.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil induces a magnetic flux through the write coil. This results in a magnetic write field being emitted toward the adjacent magnetic medium, the write field being substantially perpendicular to the surface of the medium (although it can be canted somewhat, such as 'by a trailing shield located near the write pole). The magnetic write field locally magnetizes the medium and then travels through the medium and returns to the write head at the location of the return pole where it is sufficiently spread out and weak that it does not erase previously recorded bits of data.

In order to increase the write head's ability to write a sharp transition on a perpendicular magnetic media, and also read back with a sharp signal. A write head can be incorporated with a heating element to locally heat a portion of the writer to make the writer element and read element closer to the medium during writing and reading. One problem associated with such heating elements is the consistency of touch down detection. On the other hand, the space occupied by the heating element should be minimized, while maximizing the heater efficiency.

SUMMARY OF THE INVENTION

The present invention provides a thermally controlled fly height magnetic write head having a novel heater element. The heater element has a front edge that includes a center portion having that is recessed from the air bearing surface and first and second side portions extending laterally from the center portion, each of the side portions having a front edge that tapers away from the air bearing surface. The front edge of each of the first and second side portions defines an angle that is 20 to 45 degrees relative to a plane that is parallel with the air bearing surface.

The center portion of the front edge can be recessed from the air bearing surface by a distance D and can have a width W, such that W is 1.5-2.5 times (or about 2 times) D. D is typically 2-6 um. In addition, the heater element can have an over-all depth HH from the air bearing surface and an overall width WW, such that WW is 1.5-2.5 times (or about 2 times) HH.

This configuration of the heating element has been found to provide optimal heater performance, providing optimal protrusion around the center of data track while minimizing heating/protrusion of adjacent track areas.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
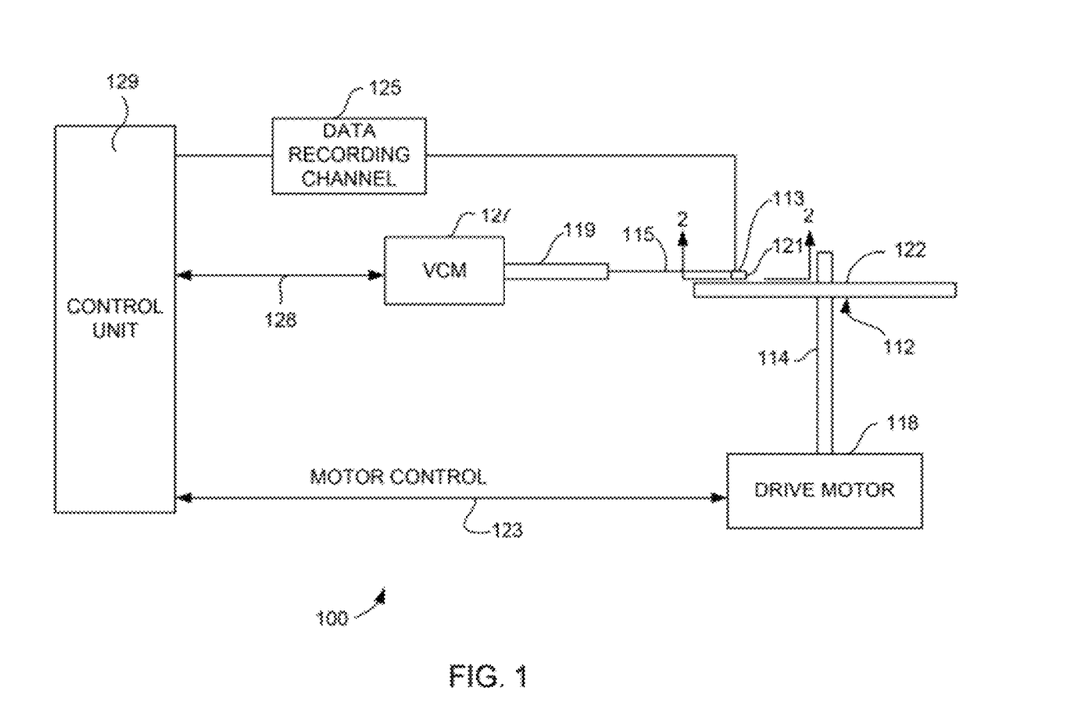
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
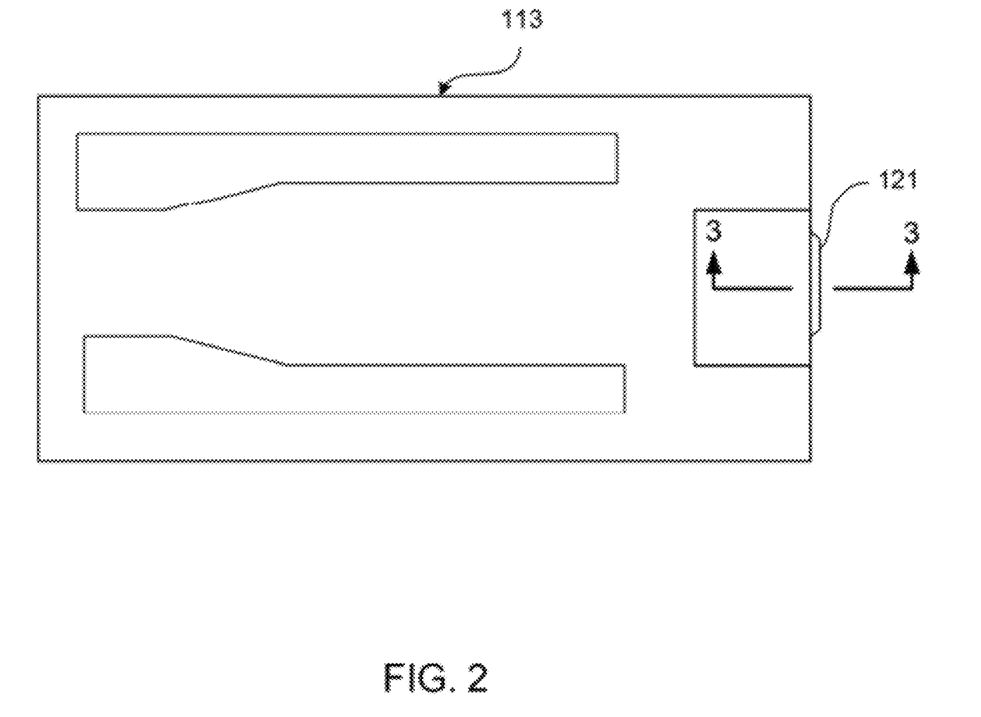
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
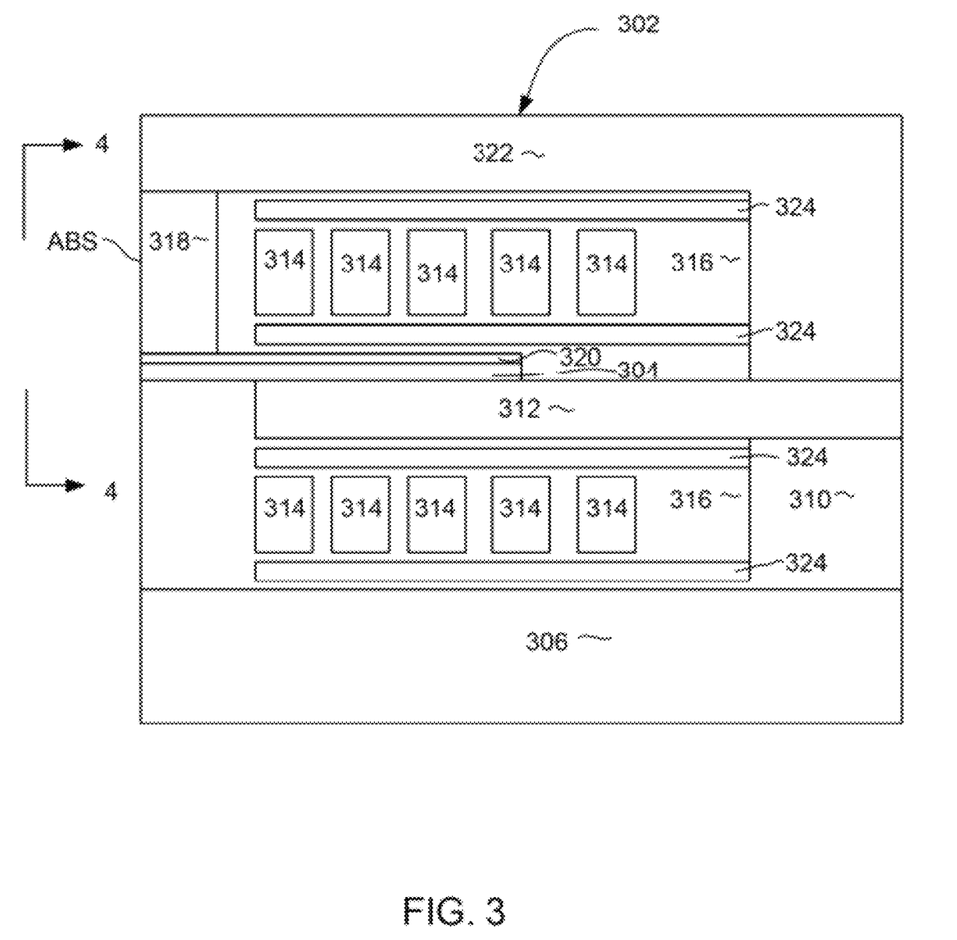
FIG. 3 is a cross sectional view of a thermally fly height control magnetic head, taken from line 3-3 of FIG. 2 and rotated 90 degrees counterclockwise, of a magnetic head according to an embodiment of the present invention.

With reference now to FIG. 3, the invention can be embodied in a magnetic head 302, which is formed upon the trailing edge of the slider 113 (FIG. 2). The write head 302 includes a magnetic write pole 304 and a magnetic return pole 306. The return pole 306 has a cross section at the air bearing surface (ABS) that is much greater than the cross section of the write pole 304 at the ABS. The write pole 304 and return pole 306 are connected with one another in a region removed from the ABS by a magnetic back gap layer 310, and by a magnetic shaping layer 312 that connects the back gap 310 with the write pole 304 and channels magnetic flux to the smaller write pole 304. The return pole 306, back gap 310 and shaping layer 312 can each be constructed of a magnetic material such as CoFe. The write pole 304 can be a lamination of magnetic layers such as CoFe separated by thin layers of non-magnetic material. This laminated write pole structure is made possible by a process described below, and is helpful in reducing eddy currents in the write pole and increasing magnetic switching within the write pole 304.

A non-magnetic, electrically conductive write coil 314, shown in cross section in FIG. 3, passes between the write pole 304 and the return pole 306, and preferably also passes above the write pole 304. The write coil can be embedded in a non-magnetic, electrically insulating layer 316 such as one or more layers of alumina and or hard baked photoresist.

When a current flows through the write coil 314, the resulting magnetic field causes a magnetic flux to flow through the return pole 306, back gap layer 310 shaping layer 312 and write pole 304. That results in a magnetic write field being emitted from the tip of the write pole 304 at the ABS. Because the write pole 304 has a small cross section at the ABS, the write field is dense and strong and can write a magnetic bit to a magnetic medium passing by the ABS of the write head 302. This magnetic write field passes through the magnetic medium before returning to the return pole 306. Because the return pole 306 has a much larger cross section at the ABS, the magnetic field returning to the return pole 306 is sufficiently spread out and weak that it does not erase the previously recorded bit.

In order to increase the field gradient of the magnetic field emitted from the write pole, and thereby increase the write speed, a magnetic trailing shield 318 can be provided adjacent to the trailing edge of the write pole 304. The trailing magnetic shield 318 can be magnetically connected with the rest of the magnetic structure at the back of the write head 302 by a trailing return pole structure 322. The trailing magnetic shield 318 is separated from the write pole 304 by a non-magnetic trailing gap layer 320.

The strength of the magnetic signal (either from the media or from the write head 302) decreases exponentially with increasing spacing between the write head 302 and the media. In order to control and minimize this spacing, a heating element 324 is provided. The heating element 324 can be located in one or more of several locations within the head 302. Preferably, the heating element 324 is located between the write coil 314 and one of the magnetic poles 306, 312, 324, 322. This heating element 324 is an electrical heating element that operates based on Joule heating when an electrical current flows through it.

Figure 4:
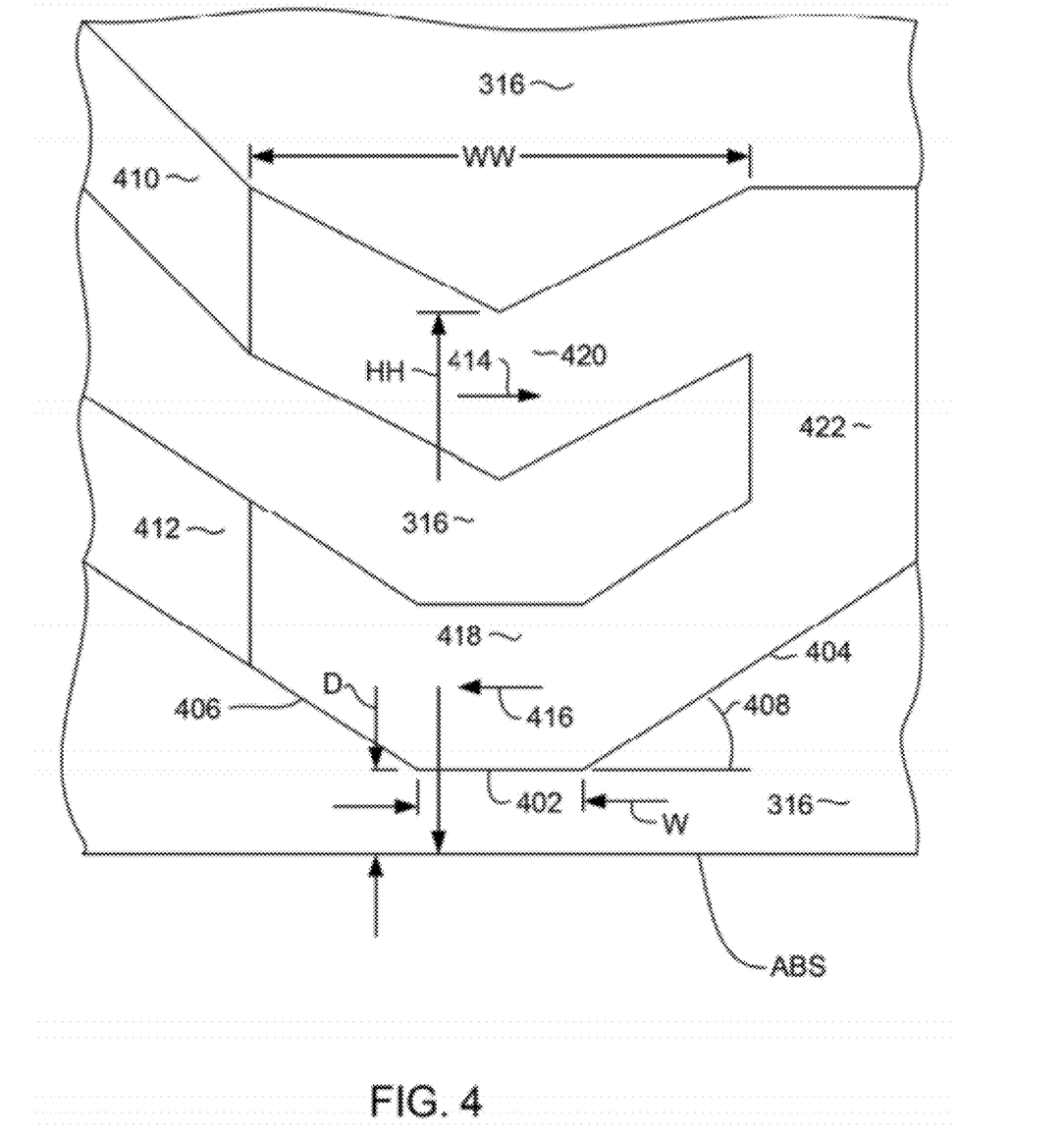
FIG. 4, is an enlarged, top down view of a heating element of the write head of FIG. 3.

The heating element 324 can be seen more clearly with reference to FIG. 4, which shows an enlarged, top-down view of the heating element 324. FIG. 4 also shows the air bearing surface (ABS). As can be seen in FIG. 4, the heating element 324 has a front edge 402 that is located a distance D from the ABS. D is typically 2-6 um. This front edge 402 has is generally straight and parallel with the ABS, and has a width W as measured in a direction parallel with the ABS. That is, the width W is measured from one end of the straight front edge to the other end of the straight front edge.

The heating element 324 also includes first and second tapered front edge portions 404, 406 that extend laterally from the ends of the front edge portion 402. The first and second tapered front edge portions 404,406 each have a front edge that tapers away from the ABS with increasing distance from the central front edge portion 402. The tapered front edge portions 404, 406 preferably define an angle 408 of 20 to 45 degrees relative to a plane that is parallel with the ABS. The inventors have found that the heating element provides optimal performance when the width W is 1.5 to 2.5 times D or about 2 times D. In other words, W=1.5D to 2.5D or about 2D. Moreover, the distance D is preferably 2-6 micrometers ($\mu m$).

The heating element 324 is preferably constructed of a metal having a high enough resistance to allow Joule heating to heat the heating element 324 when current flows through it. The leads 410, 412, connected with the heating element 324 can have a similar shape as the parts of the heating element to which they are attached, but are preferably constructed of a high electrical conductivity material such as Au or Cu.

The heating element 324 has a bent, sideways "U" shape as seen in FIG. 4. To operate the heating element an electrical current flows through the heating element, supplied by the lead lines 410, 412, the current is represented schematically as lines 414, 416. Because the heating element is formed in a bent, sideways "U" shape, the current flows first in one direction that is generally somewhat parallel with the air bearing surface as indicated by arrow 414, and then in a second direction 416 that is also generally somewhat parallel with the ABS and that is also opposite to the first direction 414. In this way, the current directions 414, 416 cancel out the magnetic field generated by the current as it flows in each direction. This advantageously prevents the current from the heating element from inadvertently writing to the magnetic medium 112 (FIG. 1) or in any way affecting the write head 302 (FIG. 3) or the read sensor (not shown).

With continued reference to FIG. 4, the heating element 324 has a front portion 418 closest to the ABS and a back portion 420 that is furthest from the ABS. The front portion 418, and back portion 420 are connected at one end by a side connector portion 422, thereby forming the bent, sideways "U" shape described above. The back portion 420 may be bent as shown so that it is closer to the ABS at its center and further from the ABS at its outer sides. The back portion 420 has a back edge 424, the central portion of which is separated by from the ABS by a distance HH. In addition, the heater element has a width WW that is measured from the innermost edge of the side portion 422 to the opposite end of the heating element (e.g. to the opposite end of the back portion 420 or front portion 418 (to the left in FIG. 4). The inventors have found that the heating element 324 achieves optimal efficiency when the overall width WW is 1.5 to 2.5 times the height HH (distance between the ABS and the center of the back edge 424) or when WW is about 2 times HH.

Figure 5:
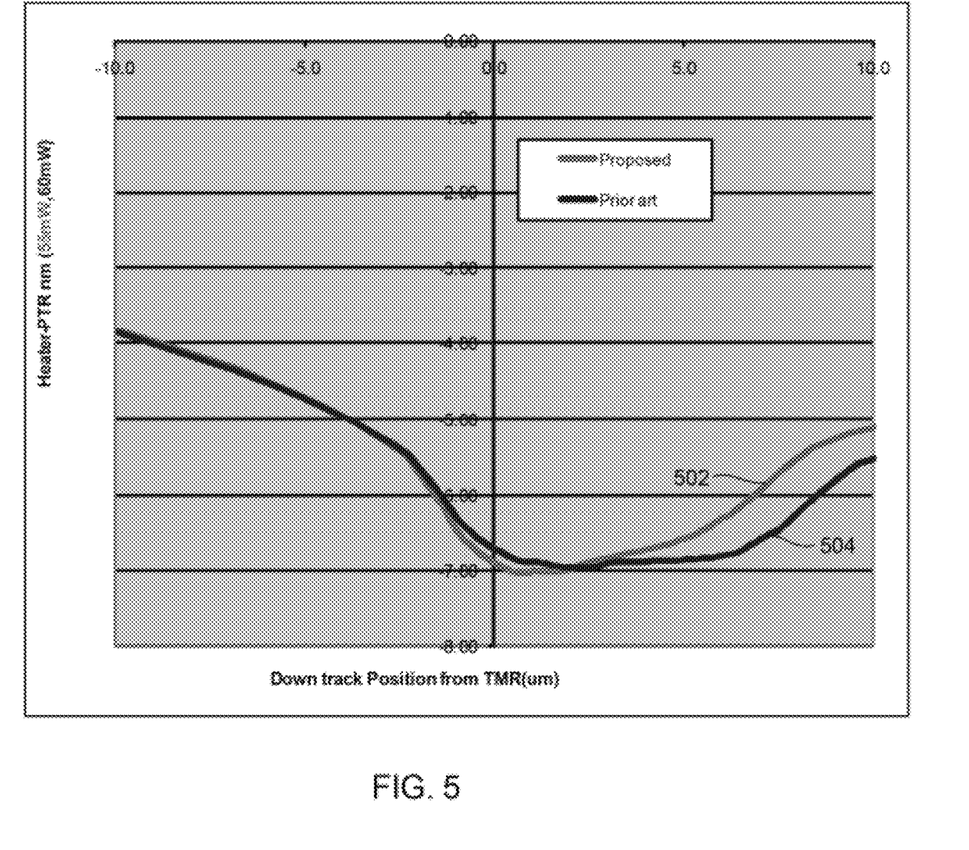
FIG. 5 is a graph showing a relationship between heater PTR and down track position for a write head implementing the invention and a write head in which the invention has not been implemented.

The heating element 324 having the centrally disposed front edge 402 and tapered side portions 404, 406 focuses the heat/protrusion in the center of recording head to insure the center of recording head is the lowest point during writing and reading. In addition, the heating element 324 configured as described with W being 1.5 to 2.5 D, and WW being 1.5 to 2.5 HH, exhibits improved efficiency, sharper protrusion and better touch-down detection consistency. The distance D is typically 2-6 um to provide good heater efficiency, while not over heating the heater. This can be seen in with reference to the graph of FIG. 5, wherein curve 502 shows relationship between heater PTR and track position for a heater described above, and curve 504 shows a relationship between heater PTR and track position for a heater that does not have the dimensional relationships or tapered sides described above.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head, comprising:
   a write pole extending to an air bearing surface;
   a heating element, the heating element having a front lead and a back lead, the front lead being located between the air bearing surface and the back lead, the front lead and back lead being connected with one another at one side and disconnected from one another at a second side opposite the first side, each of the front and back leads having a center portion with a front edge that is recessed from the air bearing surface; and
   first and second side portions extending laterally from the center portion, each of the side portions having a front edge that tapers away from the air bearing surface, the front edge of each of the first and second side portions defiling an angle that is 20 to 45 degrees relative to a plane that is parallel with the air bearing surface.

2. The magnetic write head as in claim 1 wherein the front edge of the center portion is recessed a distance D from the air bearing surface, the front edge has a width W as measured along a direction that is parallel with the air bearing surface and W is 1.5 to 2.5 times D.

3. The magnetic write head as in claim 2 wherein D is 2-6 micro meters.

4. The magnetic write head as in claim 1 wherein the front edge of the center portion is recessed a distance D from the air bearing surface, the front edge has a width W as measured along a direction that is parallel. with the air bearing surface and W is about 2 times D.

5. The magnetic write head as in claims 1, wherein the back lead has a back edge a portion of which is separated from the ABS by a distance HH, and wherein the heater has a width WW and wherein WW is 1.5 to 2.5 times HH.

6. The magnetic write head as in claim 1, wherein the back lead has a back edge a portion of which is separated from the ABS by a distance HH, and wherein the heater has a width WW and wherein WW is 1.5 to 2.5 times HH.

7. The magnetic write head as in claim 6 wherein the width WW is measured from an inner edge of the connection between the front and back leads to an opposite end of the heater.

8. The magnetic write head as in claim 7 wherein the back lead of the heater has a back edge with a center portion that is located closer to the ABS than outer portions of the back edge of the back lead, and wherein HH is measured from the ABS to the center portion of the back edge of the back lead of the heater.

9. The magnetic write head as in claim 6 wherein the width WW is measured from an inner edge of the connection between the front and back leads to an opposite end of the back portion of the heater.

10. The magnetic write head as in claim 6 wherein the width WW is measured from an inner edge of the connection between the front and back leads to an opposite end of the front portion of the heater.

11. The magnetic write head as in claim 1 wherein the heater is configured so that electrical current flowing through the heater flows through the back lead in a first direction, and through the front lead in a second direction that is substantially opposite to the first direction, such that magnetic fields from the current flowing in the first and second directions cancel one another out.

12. A magnetic write head, comprising:
    a heating element formed in a bent, "U" shape, the "U" being oriented sideways relative to an air bearing surface;
    the heating element having a front edge with a center portion and first and second side portions that taper away from the air bearing surface.

13. The write head as in claim 12 wherein the center portion of the front edge is parallel with the air bearing surface.

14. The write head as in claim 12 wherein the center portion of the front edge is parallel with the air bearing surface and recessed from the air bearing surface.

15. The write head as in claim 12 wherein the first and second side portions define an angle of 20-45 degrees relative to a plane that is parallel with the air bearing surface.

16. The write head as in claim 12 wherein the center portion is recessed from the air bearing surface by a distance D and has a width W and wherein W is 1.5 to 2.5 times D. D is typically 2-6um to have good heater efficiency, while large enough for not over heating the heater.

17. The write head as in claim 16 wherein D is 2-6 micrometers.

18. The write head as in claim 12 wherein the center portion is recessed from the air bearing surface by a distance D and has a width W and wherein W is about 2 times D.

19. The magnetic write head as in claim 12 wherein the heating element has a width WW and has a back edge located a distance HH from the air bearing surface and wherein WW is 1.5 to 2.5 HH.

20. The magnetic write head as in claim 19 wherein the heating element has a front portion located closest to the air bearing surface, a back portion located furthest from the air bearing surface and side portion connecting the front portion with the back portion, and wherein the width WW is measured from an inner edge of the side portion to an opposite end of the front portion.

21. The magnetic write head as in claim 19 wherein the heating element has a front portion located closest to the air bearing surface, a back portion located furthest from the air bearing surface and side portion connecting the front portion with the back portion, and wherein the width WW is measured from an inner edge of the side portion to an opposite end of the back portion.

22. The magnetic write head as in claim 19 wherein the heating element is configured so that current flows through the heating element in first and second directions that are opposite to one another.

23. A magnetic disk drive, comprising:
a housing;
a magnetic disk rotatably mounted within the housing;
an actuator;
a slider connected with the actuator for movement adjacent to a surface of the magnetic disk; and
a magnetic write head connected with the slider, the magnetic write head further comprising:
a write pole extending to an air bearing surface;
a heating element, the heating element having a front edge that includes a center portion having a front edge that is recessed from the air bearing surface; and
first and second side portions extending laterally from the center portion, each of the side portions having a front edge that tapers away from the air bearing surface, the front edge of each of the first and second side portions defining an angle that is 20 to 45 degrees relative to a plane that is parallel with the air bearing surface.

* * * * *

UNITED STATES PATENT AND TRADEMARK OFFICE
CERTIFICATE OF CORRECTION

PATENT NO. : 8,259,412 B2
APPLICATION NO. : 12/904943
DATED : September 4, 2012
INVENTOR(S) : Hsiao et al.

It is certified that error appears in the above-identified patent and that said Letters Patent is hereby corrected as shown below:

Column 6, line 9, please remove the "." after "parallel" and before "with"

Signed and Sealed this
Ninth Day of April, 2013

Teresa Stanek Rea
*Acting Director of the United States Patent and Trademark Office*